(12) United States Patent
Baentsch et al.

(10) Patent No.: US 6,339,820 B1
(45) Date of Patent: Jan. 15, 2002

(54) METHOD AND DEVICE FOR CARRYING OUT A FUNCTION ASSIGNED TO AN INSTRUCTION CODE

(75) Inventors: Michael Baentsch, Langnau; Peter Buhler, Thalwil; Thomas Eirich, Au; Frank Hoering; Marcus Oestreicher, both of Zurich, all of (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/302,153

(22) Filed: Apr. 29, 1999

(30) Foreign Application Priority Data

May 4, 1998 (EP) .............................................. 98108053

(51) Int. Cl.$^7$ ................................................ G06F 9/30
(52) U.S. Cl. ........................................ 712/209; 712/200
(58) Field of Search .................................. 712/209, 200

(56) References Cited

U.S. PATENT DOCUMENTS 4,703,416 A  * 10/1987  Crupi et al. ................. 711/115
5,784,640 A  *  7/1998  Asghar et al. ................. 717/5
6,058,402 A  *  5/2000  Fleiken ......................... 708/144

* cited by examiner

Primary Examiner—Kenneth S. Kim
(74) Attorney, Agent, or Firm—Louis P. Herzberg

(57) ABSTRACT

A space-efficient and flexible mechanism for implementing a virtual machine in a resource-constrained environment such as a smartcard is proposed. The virtual machine is designed for interpreting or carrying out instructions which are identified by an instruction code, also called opcode. Both, the addresses, respectively identifiers, of the functions implementing the instruction codes, respectively opcodes, which the virtual machine interprets, as well as parameters to those functions are kept within lookup tables.

40 Claims, 1 Drawing Sheet

METHOD AND DEVICE FOR CARRYING OUT A FUNCTION ASSIGNED TO AN INSTRUCTION CODE

FIELD OF THE INVENTION

The invention relates to a method and a device for carrying out at least one function assigned to an instruction code. More particularly, the method, respectively the device, represents a space-efficient and flexible mechanism for implementing a virtual machine in a resource-constrained environment such as a smartcard, particularly a smartcard offering a Java environment, such as a Javacard.

TECHNICAL FIELD AND BACKGROUND OF THE INVENTION

In a system environment with constrained resources such as limited code storage area, usually a ROM, limited application storage area, usually an EEPROM, limited runtime memory, usually a RAM, and limited compute power, i.e, small CPU and low clock cycle rate, the interpretive approach to running applications is well-known. Due to the higher level of abstraction provided by the interpreted code over the machine code, the use of more compact application code is possible, which is an essential requirement in the aforementioned environments. Therefore, the availability of an interpreter is desirable in an embedded system.

OBJECT AND ADVANTAGES OF THE INVENTION

It is an object of the invention according to claim 1 and 8, to provide a method and a device for executing instruction codes, which require less memory. It is another object of the invention according to claim 1 and 8, to provide a method and a device for executing instruction codes which provides for an easier way to amend the instructions codes, respectively functions which are to be carried out.

The above mentioned objects are met by a method according to claim 1 and a device according to claim 8. Regardless of whether the interpreter, also called "virtual machine", is implemented in software or in hardware, the following two problems are solved:

Firstly, the size of the internal main loop serving for the dispatching respectively executing of the codes, herein called "opcodes", interpreted in the virtual machine, as well as the size and also number of functions necessary to implement the opcodes is reduced. It is most advantageous to get both to the minimum size because of the aforementioned resource constraints in embedded systems, i.e. a system e.g. on a smartcard.

Secondly, it might be desirable to be able to change and/or enhance the semantics of single opcodes without changing the code of either the main loop or code implementing the other opcodes. The latter is especially important in an area where opcodes can change due to specification changes, error fixes, particularly at the level of single opcodes, or performance improvements requiring the modification/addition of single opcodes.

The approach using a virtual machine which is designed for interpreting or carrying out instructions which are identified by an instruction code whereby the addresses of the functions implementing the opcodes which the virtual machine interprets, as well as parameters to those functions are kept within lookup tables, yields two primary benefits:

First, the main interpreter loop is very small, and due to the parameter table, generic functions can be referred to by the opcode table, thus leading to a very space-efficient representation of the virtual machine code.

Second, by placing these tables into a mutable memory, such as an EEPROM, error-fixing as well as general maintenance of the virtual machine is feasible at the level of single opcodes even after production of the actual hardware.

SUMMARY OF THE INVENTION

The invention uses generic opcode tables in conjunction with parameter tables. The idea is to use two types of lookup tables at the core of the virtual machine implementation. The first table, called also "opcode lookup table", contains for each opcode the address of a function implementing its semantics. As these functions might be generic, i.e., serve for several opcodes as their implementation, a second, discriminating table, also called "parameter lookup table", is used. Both tables contain the same number of entries, which is identical to the number of opcodes understood by the respective virtual machine. The tables can also be unified to one single table with the opcodes, the functions and the parameters as entries.

Especially in a scenario, where many functions can be shared between opcodes, this approach is advantageous: Only a minimum number of these generic routines, which hence results in an according minimum requirement of code size, need be employed because of the use of the functionality-discriminating parameter table. For example, it is assumed that such a scenario of function-sharing for opcode implementations is common if a virtual machine originally intended for a non-resource-constrained environment has to be semantically stripped down to run in a resource-constrained environment. Therewith, the reduction of the functionality of the virtual machine eventually leads to a reduction in complexity of many opcodes, in turn leading to the aforementioned opportunity to create generic functions.

Execution of the virtual machine main loop then can proceed as follows:

An opcode to be interpreted is loaded from memory.

The address of the opcode-realizing function is looked up from the opcode lookup table.

A parameter for this function is read from the parameter lookup table. This part of the procedure is optional. Possibly no parameter may be needed. The lookup then returns no parameter or a read parameter can be ignored by the function.

The parameter can be loaded into a unique address, e.g., a variable.

The function for the instruction code is called and executed.

The function returns, and the next opcode is fetched and executed.

This way, the code of the core of the virtual machine does not need modification, even if new opcodes are added, since the table is in that case just extended. Also, if old codes are changed, address and parameter entries can be simply changed at the index corresponding to the respective opcode. If opcodes are to be removed, table entries can be invalidated.

By the invention's concept, the implementation of the virtual machine core and the implementation of each single opcode are separated.

This yields the following advantages: The virtual machine core is extremely small in size. By having the lookup tables reside in immutable memory, e.g. a ROM, an implementation of a virtual machine can be secured against future changes. By having the lookup tables reside in mutable memory, e.g. EEPROM, an implementation of a virtual machine can be changed after delivery of the implementation to the customer.

Although optimizing compilers are known to build memory-efficient jump tables for the alternative implementation of a virtual machine core, i.e., CASE or SWITCH statements, they have four primary disadvantages solved by the proposed concept: First, they still bear an overhead due to the inclusion of the inevitable 'JMP' machine code statement, which is necessary, since executable code must be the result of a compiler/linker. Second, they always reside in the immutable area shared with all machine code. Third, it is impossible to only change single cases, i.e., implementations of single opcodes after the code has been produced, i.e., put into ROM or hardware. Fourth, compiler-generated optimizations are highly compiler-dependent and cannot be relied on to be done correctly on all platforms.

The advantage of the proposed solution is that it works on all system architectures the virtual machine is intended to work in, without change. In fact, if the virtual machine core were implemented in hardware, by putting the lookup tables into mutable memory, this approach would permit the enhancement of a hardware-based virtual machine even after production "in the field", i.e., even after a customer has started to use it. This is an invaluable advantage if resources are scarce, thus not permitting an update of the complete virtual machine if only single opcode's implementations need enhancements.

DESCRIPTION OF THE DRAWINGS

An example of the invention is depicted in the drawing and described in detail below by way of example. It is shown in an arrangement with a virtual machine and a memory section with the lookup functions for instruction code. The figure is for sake of clarity not shown in real dimensions, nor are the relations between the dimensions shown in a realistic scale.

DETAILED DESCRIPTION OF THE INVENTION

Figure 1:
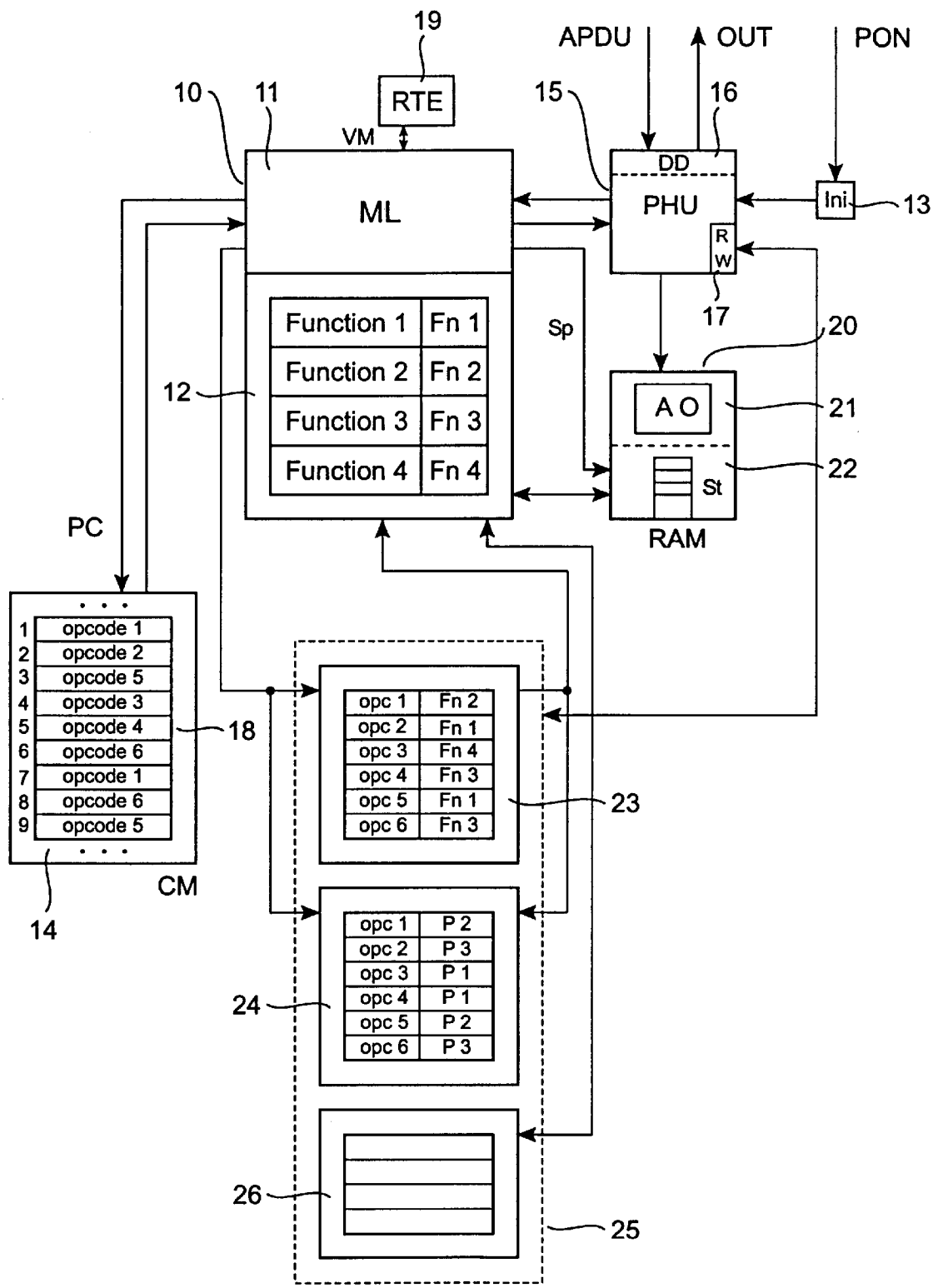

In the following, the various exemplary embodiments of the invention are described.

As shown in the figure, a protocol-handling unit 15, denoted with "PHU", comprises a device driver 16, denoted with "DD", and a read-write unit 17, denoted with "RW". The PHU 15 communicates bidirectionally with a virtual machine 10, also called "VM", serving as control means, which comprises a main loop unit 11, also called "ML", and a function section 12, also called function memory, in which a set of possible functions Function1, Function2, Function3, Function4 is stored in form of machine code. Each function Function1, Function2, Function3, Function4 is addressable via an identifier Fn1, Fn2, Fn3, Fn4.

The VM 10 provides a program counter PC which is assigned to a virtual machine instruction-code-storing means 14 in which code sequences 18 which belong to methods which themselves belong to applets are stored. Applets are collections of data and the therewith-operating methods.

The code sequences 18 consist of single instruction codes opcode1, opcode2, opcode3, opcode4, opcode5, opcode6. The virtual machine instruction-code-storing means 14, also called code memory or CM 14, is communicated with by the ML 10 which again communicates with a first table means 23 and a second table means 24 which both together with a heap memory 26 form part of a memory unit 25, here exemplarily an EEPROM, short EE. The outputs of the table means 23, 24 lead back to the function section 12 to which the heap memory 26 is bidirectionally connected. The PHU 15 further is connected to a random-access memory or RAM 20 which comprises an APDU-object-storing section 21, short AO, and a stack-storing section 22, short St. This St 22 has a bidirectional connection to the function section 12 of the VM 10 and is bound to a stack pointer SP which is provided by the ML 11. The RW 17 can bidirectionally exchange data with the memory unit 25.

An initialization unit 13, denoted "Ini", is receiving external input via a Power-On line PON and is providing its output to the PHU 15. The PHU 15 receives external input via an input line which delivers application protocol data units, short APDUs. An applet administration unit, also called runtime environment 19, short RTE 19, is communicating bidirectionally with the VM 10.

The depicted arrangement is preferably arranged on a portable carrier, such as a smartcard, or Javacard. The card can be inserted into a card reader which provides an interface towards external circuitry which communicates with the smartcard via this interface. The interface is to a high degree standardized. APDUs arrive via the card reader at the DD 16 of the PHU 15. The PHU 15 can handle various types of APDUs, which types are "SELECT" APDUs, "READ EE" APDUs, "WRITE EE" APDUs and other APDUs, herein called "standard" APDUs. The type of APDU which is arriving is recognized in the PHU 15.

During an initialization phase, the initialization unit 13 is active. Upon power on, arriving via the PON line, which simply may be the necessary electrical power needed to run the card circuitry, and a reset signal, inter alia the St 22 is cleared, the PC and the SP are reset, the RAM 20 is cleared, the heap memory 26 is initialized and in the St 22 a system APDU object is initialized in that an APDU object header is written. The PHU 15 is then enabled and waiting for input.

As next step, upon arrival of a first APDU which is a SELECT APDU, in the case, when a default applet has not been chosen as the so-called "current applet", the SELECT APDU is recognized by the PHU 15, such that the applet in the CM 14 which is identified by the SELECT APDU is selected to be the current applet. Each stored applet contains a number of methods, among which inter alia is stored a process-method, a select-method, an install method and a deselect-method.

The arrival of a standard APDU triggers the use of the predetermined current applet for the standard APDU, and more particularly the process-method of the current applet. The VM execution start address of the process-method of the current applet is the address where the first to execute instruction code opcode 1–6 for that process-method is stored in the CM 14. This address is known by the RTE 19 which provides via the VM 10 for the PC being set on that address in the CM 14.

The VM 10 begins to interpret the instruction code sequence 18 from the VM execution start address on. This interpretation comprises the determination of the respective functions to be carried out for this instruction code sequence 18, starting with the function Function1–4 for the first instruction code opcode 1–6 of that instruction code sequence 18.

Therefor, the instruction code opcode 1–6 at the address which the PC points to is fed to the first table means 23 which for every possible instruction code opc 1–6 comprises the respective function identifier Fn1–4 which identifies the function Function1–4 which is assigned to the respective instruction code opcode 1–6. The instruction code opcode 1–6 at the address which the PC points to is also fed to the second table means 24 which for every possible instruction code opc 1–6 comprises the respective parameters P1, P2, P3 which belong to the identified function Function1–4 for this instruction code opcode 1–6. This feeding is executed by the ML 11.

The found function identifier Fn1–4 together with the identified parameters P1, P2, P3 is delivered to the function section 12 where the function identifier Fn1–4 is used to address the storage cell where the respective function Function1–4 is stored. This addressing is again carried out by the ML 11 which then effects that the identified function Function1–4 is then carried out.

The functions can perform various actions. A function Function1–4 can e.g. access the heap memory 26 or the stack-storing section 22 and can thereby modify the SP and/or the PC of the VM 10. As long as the St 22 is not empty, the PC is incremented either by one step or by the number of steps, an instruction code opcode 1–6 contains as function Function1–4, i.e. a "Goto" or "Jump" function Function1–4.

After completing the function Function1–4 for the last instruction code opcode 1–6 of a method, the stack pointer SP arrives at a predetermined value indicating to the VM 10 that the stack-storing section 22 is empty. Then, the control is given back to the PHU 15 which returns data, such as status data via the OUT line to the card reader and then expects the next APDU to arrive.

The PHU 15 receives the APDUs and stores them, but usually only one at a time, in the RAM 20 at the area of the APDU object payload, assigned to the existing object header which was generated during the initialization phase.

In the RAM 20, the APDU object is stored, which is then accessible by the instruction codes. Thereby, the instruction codes can access data which is needed to perform a particular action, e.g. reading a number representing a monetary value which is to be charged onto a storage cell, which represents the saldo of an account.

In the case, when a SELECT APDU is recognized by the PHU 15, the current applet is used, but now as a first action the deselect-method thereof is to be used instead of the process-method. The respective instruction code sequence 18 of the deselect-method is hence executed via the VM 10. Afterwards, as a second action, a new current applet is selected according to the information from the SELECT APDU and for the new current applet the select-method is executed by the VM 10.

When a READ APDU is recognized, then the VM 10 is not activated but the memory unit 25 is directly accessed by the PHU 15 for a read-operation, whose result is then output to the card reader via the OUT line. When a WRITE APDU is recognized, then the VM 10 is not activated but the memory unit 25 is directly accessed by the PHU 15 for a write-operation, using the respective part of the content of the WRITE APDU as the new content of a specific memory cell in the memory unit 25. The processing of READ APDUs and WRITE APDUs may be disabled via a suited mechanism, be it a hardware- or a software-implemented mechanism, to avoid misuse of these APDUs for forbidden actions on the smartcard.

The tables 23, 24 can be unified to one single table which then contains only one address to determine the function identifier Fn1–4 and the corresponding parameters P1, P2, P3 in ony single step. This saves time and memory.

The tables can be stored in non-mutable as well as in mutable memory. The use of mutable memory is advantageous since then changes in the assignment between functions and instruction codes are easily executable. Also a mixed use of mutable and non-mutable memory can be suitable, particularly when some content of the tables is to be protected from erroneous or even intentional amendment and other content is to be rendered easily accessible for such amendments. Basic functions and/or a sort of default settings can e.g. be stored in non-mutable memory, to preserve card functionality in any case. A new function Function1–4 can be added to the set of available functions Function1, Function2, Function3, Function4 in that the new function Function1–4 is entered in a mutable new-function memory and that the identifier Fn1–4 in the first table 23 is changed to identify the new function Function1–4 in the mutable new-function memory. The mutable new-function memory can be a separate memory section, but of course be also unified or identical with the function memory 12.

For an instruction code opcode 1–6 which is at least temporarily no longer needed, an identifier Fn1–4 can be entered in the first table 23 which signalizes that no function Function1–4 is to be executed.

The number of instruction codes, storage cells, functions a.s.o. is exemplary only and hence not limited to the herein chosen number. Additionally another heap memory 26 can be arranged in the ram 20, which heap memory 26 can also be accessible by the functions. (Javacard is a trademark of Sun Microsystems, Inc.)

What is claimed is:

1. A method for carrying out at least one function (Function1, Function2, Function3, Function4) assigned to an instruction code (opcode 1–6) whereby said instruction code (opcode 1–6) is read out from a stored instruction code sequence characterized in that by use of a first table (23) which for a set of possible instruction codes (opc 1–6) contains an identifier (Fn1, Fn2, Fn3, Fn4) for each respective function (Function1, Function2, Function3, Function4), said function (Function1, Function2, Function3, Function4) for said instruction code (opcode 1–6) is identified and that by use of a second table (24) which for said set of possible instruction codes (opc 1–6) contains at least one respective function parameter (P1, P2, P3) each comprising at least one parameter for executing said respective function of said instruction code, the at least one function parameter (P1, P2, P3) for said instruction code (opcode 1–6) is identified, such that from a set of available functions (Function1, Function2, Function3, Function4) said function (Function1, Function2, Function3, Function4) with said identified parameter (P1, P2, P3) is selected and carried out.

2. A method according to claim 1, characterized in that the tables (23, 24) are unified to a single table.

3. A method according to claim 1, characterized in that at least one of the tables (23, 24) is stored in a mutable table memory.

4. A method according to claim 1, characterized in that a WRITE APDU is used for amending at least part of the content of at least one of the tables (23, 24) and/or that a READ APDU is used for reading at least part of the content of at least one of the tables (23, 24).

5. A method according to claim 1, characterized in that the set of available functions (Function1, Function2, Function3, Function4) is at least partially stored in a mutable function memory.

6. A method according to claim 1, characterized in that a new function (Function1, Function2, Function3, Function4)

is added to the set of available functions (Function1, Function2, Function3, Function4) in that the new function (Function1, Function2, Function3, Function4) is entered in a mutable new-function memory and that the identifier (Fn1, Fn2, Fn3, Fn4) in the first table (23) is changed to identify the new function (Function1, Function2, Function3, Function4) in the mutable new-function memory.

7. A method according to claim 1, characterized in that for an instruction code (opcode 1–6) which is at least temporarily no longer needed, an identifier (Fn1, Fn2, Fn3, Fn4) is entered in the first table (23) which signalizes that no function (Function1, Function2, Function3, Function4) is to be executed.

8. A method according to claim 2, characterized in that the set of available functions (Function1, Function2, Function3, Function4) is at least partially stored in a mutable function memory.

9. A method according to claim 3, characterized in that the set of available functions (Function1, Function2, Function3, Function4) is at least partially stored in a mutable function memory.

10. A method according to claim 4, characterized in that the set of available functions (Function1, Function2, Function3, Function4) is at least partially stored in a mutable function memory.

11. A method according to claim 2, characterized in that a new function (Function1, Function2, Function3, Function4) is added to the set of available functions (Function1, function2, Function3, Function4) in that the new function (Function1, Function2, Function3, Function4) is entered in a mutable new-function memory and that the identifier (Fn1, Fn2, Fn3, Fn4) in the first table (23) is changed to identify the new function (Function1, Function2, Function3, Function4) in the mutable new-function memory.

12. A method according to claim 3, characterized in that a new function (Function1, Function2, Function3, Function4) is added to the set of available functions (Function1, Function2, Function3, Function4) in that the new function (Function1, Function2, Function3, Function4) is entered in a mutable new-function memory and that the identifier (Fn1, Fn2, Fn3, Fn4) in the first table (23) is changed to identify the new function (Function1, Function2, Function3, Function4) in the mutable new-function memory.

13. A method according to claim 4, characterized in that a new function (Function1, Function2, Function3, Function4) is added to the set of available functions (Function1, Function2, Function3, Function4) in that the new function (Function1, Function2, Function3, Function4) is entered in a mutable new-function memory and that the identifier (Fn1, Fn2, Fn3, Fn4) in the first table (23) is changed to identify the new function (Function1, Function2, Function3, Function4) in the Mutable new-function memory.

14. A method according to claim 5, characterized in that a new function (Function1, Function2, Function 3, Function4) is added to the set of available functions (Function1, Function2, Function3, Function4) in that the new function (Function1, Function2, Function3, Function4) is entered in a mutable new-function memory and that the identifier (Fn1, Fn2, Fn3, Fn4) in the first table (23) is changed to identify the new function (Function1, Function2, Function3, Function4) in the mutable new-function memory.

15. A method according to claim 2, characterized in that for an instruction code (opcode 1–6) which is at least temporarily no longer needed, an identifier (Fn1, Fn2, Fn3, Fn4) is entered in the first table (23) which signalizes that no function (Function1, Function2, Function3, Function4) is to be executed.

16. A method according to claim 3, characterized in that for an instruction code (opcode 1–6) which is at least temporarily no longer needed, an identifier (Fn1, Fn2, Fn3, Fn4) is entered in the first table (23) which signalizes that no function (Function1, Function2, Function3, Function4) is to be executed.

17. A method according to claim 4, characterized in that for an instruction code (opcode 1–6) which is at least temporarily no longer needed, an identifier (Fn1, Fn2, Fn3, Fn4) is entered in the first table (23) which signalizes that no function (Function1, Function2, Function3, Function4) is to be executed.

18. A method according to claim 5, characterized in that for an instruction code (opcode 1–6) which is at least temporarily no longer needed, an identifier (Fn1, Fn2, Fn3, Fn4) is entered in the first table (23) which signalizes that no function (Function1, Function2, Function3, Function4) is to be executed.

19. A method according to claim 6, characterized in that for an instruction code (opcode 1–6) which is at least temporarily no longer needed, an identifier (Fn1, Fn2, Fn3, Fn4) is entered in the first table (23) which signalizes that no function (Function1, Function2, Function3, Function4) is to be executed.

20. An article of manufacture comprising a computer usable medium having computer readable program code means embodied therein for causing a carrying out of at least one function assigned to an instruction code, the computer readable program code means in said article of manufacture comprising computer readable program code means for causing a computer to effect the steps of:
   reading out said instruction code from a stored code sequence;
   using a first table which for a set of possible instruction codes contains an identifier for each respective function;
   identifying said function for said instruction code;
   using a second table which for said set of possible instruction codes contains at least one respective function parameter, comprising at least one parameter for executing said respective function;
   identifying the at least one function parameter for said instruction code; and
   selecting and carrying out from a set of available functions the identified function with the identified at least one parameter.

21. An article of manufacture according to claim 20, wherein the first and second tables are unified into a single table.

22. An article of manufacture according to claim 20, wherein at least one of the tables is stored in a mutable table memory.

23. An article of manufacture according to claim 20, the computer readable program code means in said article of manufacture further comprising computer readable program code means for causing a computer to effect amending at least part of the content of at least one of the tables using a WRITE APDU.

24. An article of manufacture according to claim 20, the computer readable program code means in said article of manufacture further comprising computer readable program code means for causing a computer to effect using a READ APDU for reading at least part of the content of at least one of the tables.

25. An article of manufacture according to claim 20, wherein the set of available function is at least partially stored in a mutable function memory.

26. An article of manufacture according to claim 20, the computer readable program code means in said article of manufacture further comprising computer readable program code means for causing a computer to effect:

adding a new function to the set of available functions; entering the new function in a mutable new-function memory; and changing the identifier in the first table to identify the new function in the mutable new-function memory.

27. An article of manufacture according to claim 20, the computer readable program code means in said article of manufacture further comprising computer readable program code means for causing a computer to effect entering a signalizing identifier in the first table which signalizes that no function is to be executed for an instruction code which is at least temporarily no longer needed.

28. A device for carrying out at least one function (Function1, Function2, Function3, Function4) assigned to an instruction code (opcode 1–6), comprising storage means for storing an instruction code sequence (18), and control means (10) for reading said instruction code (opcode 1–6) out of said instruction code sequence, characterized in that it further comprises first table means for a first table (23) which for every possible instruction code (opc 1–6) includes an identifier (Fn1, Fn2, Fn3, Fn4) for the respective function (Functionl, Function2, Function3, Function4) and which is dedicated for identifying the function (Function1, Function2, Function3, Function4) for said instruction code (opcode 1–6), second table means with a second table (24) which for every possible instruction code (opc 1–6) includes at least one respective function parameter (P1, P2, P3) each comprising at least one parameter for executing said respective function of said instruction code, and which is dedicated for identifying the at least one function parameter (P1, P2, P3) for said instruction code (opcode 1–6), and processing means for carrying out said identified function (Function1, Function2, Function3, Function4) with said identified parameter (P1, P2, P3) which has been selected from a set of available functions (Functionl, Function2, Function3, Function4).

29. A device according to claim 28, characterized in that at least one of the tables is stored in a mutable table memory and/or that the set of available functions (Function1, Function2, Function3, Function4) is at least partially stored in a mutable function memory.

30. A device according to claim 28, characterized in that a WRITE APDU is usable for amending at least part of the content of at least one of the tables (23, 24) and/or that a READ APDU is usable for reading at least part of the content of at least one of the tables.

31. A device according to claim 28, characterized in that a new function (Function1, Function2, Function3, Function4) is addable to the set of available functions (Function1, Function2, Function3, Function4) in that the new function (Function1, Function2, Function3, Function4) is enterable in a mutable new-function memory and that the identifier (Fn1, Fn2, Fn3, Fn4) in the first table (23) is changeable to identify the new function (Function1, Function2, Function3, Function4) in the mutable new-function memory.

32. A device according to claim 28 further comprising a smartcard.

33. A method for carrying out at least one function assigned to an instruction code, the method comprising:

reading out said instruction code from a stored code sequence;

using a first table which for a set of possible instruction codes contains an identifier for each respective function;

identifying said function for said instruction code;

using a second table which for said set of possible instruction codes contains at least one respective function parameter, comprising at least one parameter for executing said respective function;

identifying the at least one function parameter for said instruction code; and selecting and carrying out from a set of available functions the identified function with the identified at least one parameter.

34. A method according to claim 33, wherein the first and second tables are unified into a single table.

35. A method according to claim 33, wherein at least one of the tables is stored in a mutable table memory.

36. A method according to claim 33, further comprising amending at least part of the content of at least one of the tables using a WRITE APDU.

37. A method according to claim 33, further comprising using a READ APDU for reading at least part of the content of at least one of the tables.

38. A method according to claim 33, wherein the set of available function is at least partially stored in a mutable function memory.

39. A method according to claim 33, further comprising:

adding a new function to the set of available functions;

entering the new function in a mutable new-function memory; and changing the identifier in the first table to identify the new function in the mutable new-function memory.

40. A method according to claim 33, further comprising entering a signalizing identifier in the first table which signalizes that no function is to be executed for an instruction code which is at least temporarily no longer needed.

* * * * *